(12) United States Patent
Hengstler et al.

(10) Patent No.: US 11,953,364 B2
(45) Date of Patent: Apr. 9, 2024

(54) FILL LEVEL MEASURING ARRANGEMENT AND METHOD FOR OPERATING A FILL LEVEL MEASURING ARRANGEMENT

(71) Applicant: VEGA GRIESHABER KG, Wolfach (DE)

(72) Inventors: Clemens Hengstler, Haslach (DE); Matthias Schmidt, Schonach (DE)

(73) Assignee: VEGA GRIESHABER KG, Wolfach (DE)

( * ) Notice: Subject to any disclaimer, the term of this patent is extended or adjusted under 35 U.S.C. 154(b) by 915 days.

(21) Appl. No.: 16/940,973

(22) Filed: Jul. 28, 2020

(65) Prior Publication Data

US 2021/0041285 A1  Feb. 11, 2021

(30) Foreign Application Priority Data

Aug. 7, 2019  (DE) .................. 10 2019 121 378.9

(51) Int. Cl.
| | |
|---|---|
| *G01F 23/284* | (2006.01) |
| *H02N 11/00* | (2006.01) |
| *H04B 1/38* | (2015.01) |
| *H04Q 9/00* | (2006.01) |

(52) U.S. Cl.
CPC ......... *G01F 23/284* (2013.01); *H02N 11/002* (2013.01); *H04B 1/38* (2013.01); *H04Q 9/00* (2013.01); *H04Q 2209/43* (2013.01)

(58) Field of Classification Search
None
See application file for complete search history.

(56) References Cited

U.S. PATENT DOCUMENTS

| | | | |
|---|---|---|---|
| 6,535,827 B1 | 3/2003 | Lestina et al. | |
| 2006/0201245 A1* | 9/2006 | Huber | G01F 23/003 73/290 R |
| 2011/0270423 A1 | 11/2011 | Maier | |
| 2014/0130874 A1* | 5/2014 | Burlage | G01F 25/22 700/19 |
| 2016/0161320 A1* | 6/2016 | Ohmayer | G01F 23/0046 73/290 V |
| 2016/0280420 A1* | 9/2016 | Velasquez Posada | B65D 25/00 |
| 2020/0149947 A1* | 5/2020 | Laun | G01F 25/20 |

OTHER PUBLICATIONS

GPTO office action for related German application 10 2019 121 378.9 dated May 25, 2020.

* cited by examiner

*Primary Examiner* — Alvaro E Fortich
*Assistant Examiner* — Carl F. R. Tchatchouang
(74) *Attorney, Agent, or Firm* — William Gray Mitchell

(57) ABSTRACT

A measuring arrangement for measuring a fill level in a bypass of a container with a measuring instrument, in particular a fill level or point level measuring instrument, wherein the bypass is connected to the container by means of at least two container connections, characterized by a monitoring device for monitoring a consistency of the container connections, which is coupled with the measuring instrument.

11 Claims, 4 Drawing Sheets

FILL LEVEL MEASURING ARRANGEMENT AND METHOD FOR OPERATING A FILL LEVEL MEASURING ARRANGEMENT

CROSS REFERENCE TO RELATED APPLICATIONS

This patent application claims priority to German Patent Application 102019121378.9, filed on Aug. 7, 2019.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The invention is a fill level measuring arrangement and method for operating a fill level measuring arrangement Background of the Invention From the prior art, various measuring arrangements are known for measuring fill levels or point levels in containers. For the sake of simplicity, only fill level measuring arrangements are discussed in the following, but all statements refer to fill level as well as point level measuring arrangements.

In order to be able to carry out maintenance work on fill level sensors during operation, isolating devices such as ball valves are used during the installation of the sensors in container connections. As a result, the sensor can be completely separated from the process without interrupting it. This leads to the sensor (fill level and point level) providing a presumably valid measurement value, although the isolating device is completely closed or only partially open. However, the measurement value can be negatively influenced by the (partially) closed isolating device.

In particular with foaming media, but also with measuring arrangements with strong movement of the medium, e.g. by stirring instruments or inflows, a fill level or point level measurement can be made significantly more difficult due to the foam or wave formation. In such cases, an arrangement of the measuring instrument in a bypass is often utilized, because it is best able to rectify the aforementioned problems. In addition, a fill level measuring instrument housed in the bypass can also be protected against mechanical effects.

A bypass is an additional vessel attached to the outside of the container, which is usually designed in the form of a tube. Generally, the tube is connected to the container at the lower end as well as at the upper end by means of a container connection, and the position of the upper and lower container connection also gives the maximum measuring range for the fill level. The connection to the upper end serves to equalize pressure. Container and bypass thus form a system of "communicating tubes," for which reason the fill level in the tube is always equal to the container.

A measuring arrangement with a container 1 and a bypass 3 arranged on the container 1, as known from the prior art, is shown in FIG. 1.

The measuring arrangement 100 according to the exemplary embodiment shown in FIG. 1 comprises a measuring instrument 9 arranged in the bypass 3, which is designed as a radar fill level measuring instrument. The radar fill level measuring instrument shown in FIG. 1 works according to the guided wave principle, but can, in principle, be replaced by any other suitable measuring instrument for the fill level or point level measuring, for example a vibration point level sensor or a pressure sensor.

The bypass 3 is connected to the container 1 by means of two container connections 5. In order to not have to empty the complete container 1 but rather only the bypass 3 for work at the bypass 3, two valves 7, which are designed as isolating valves in the present case, are arranged between the container 1 and the bypass 3. If work must be carried out on the bypass 3, the valves 7 can be closed and thus the bypass 3 can be separated from the container 1.

Both in the case of measurements in bypass systems as well as for other measuring arrangements in which the sensor can be separated from the process by means of a container connection with an isolating device, the quality and reliability of the measurement depend upon the consistency of the container connections. If one of the container connections is closed, e.g. by an isolating valve or sedimentation, there is thus no longer a connection to the main process in the container, and the measured fill level in the bypass loses its validity. A fill level sensor that is arranged in the bypass, e.g. a continuously measuring fill level sensor, will continue to output a measurement value, because the process medium is still in the bypass; however, changes to the fill level in the container have only a delayed or reduced affect, or none at all, on the fill level in the bypass, such that the measurement results are no longer accurate.

In addition, there may be a safety risk if, for example, one of the container connection lines was not reopened after maintenance. Thus, the principle of the communicating tubes of a bypass system no longer functions. Previously, in the case of a closed isolating valve, the maintenance personnel have had to recognize that the measurement value of the fill level measuring instrument in the bypass no longer corresponds to the actual fill level in the container. However, because the fill level sensor outputs a valid measurement value that does not correspond to the actual fill level in the container, there can be significant problems with the monitored processes.

The same applies to other measuring arrangements in which the sensor can be separated from the process by means of a container connection with an isolating device if a container connection has been clogged by sedimentation in the process.

It is the objective of the present invention to provide a measuring arrangement that overcomes the disadvantages known from the prior art.

This objective is attained with a measuring arrangement having the features as described herein.

BRIEF SUMMARY OF THE INVENTION

In a preferred embodiment, a measuring arrangement (100) for measuring a fill level in a container with a measuring instrument (9), in particular a fill level or point level measuring instrument, wherein the measuring instrument (9) is connected to the container by means of at least one container connection, characterized by a monitoring device (11) for monitoring a consistency of the at least one container connection (5) that is coupled with the measuring instrument (9).

In another preferred embodiment, the measuring arrangement (100) as described herein, characterized in that the monitoring device (11) has one measuring device (13) for each container connection (5).

In another preferred embodiment, the measuring arrangement (100) as described herein, characterized in that the measuring devices (13) have a radio module (15) for wireless communication with the measuring instrument (9).

In another preferred embodiment, the measuring arrangement (100) as described herein, characterized in that the measuring devices (13) have an integrated energy supply (19).

In another preferred embodiment, the measuring arrangement (100) as described herein, characterized in that the energy supply (19) has an energy harvesting module (21).

In another preferred embodiment, the measuring arrangement (100) as described herein, characterized in that a valve (7) is arranged between the container connections (5) and the bypass (3) and the energy harvesting module (21) is coupled with the valve (7) in such a way that it generates energy due to a movement of the valve (7).

In another preferred embodiment, the measuring arrangement (100) as described herein, characterized in that the measuring devices (13) transmit a valve position of the valve (7) to the measuring instrument (9).

In another preferred embodiment, the measuring arrangement (100) as described herein, characterized in that there is a communication between the monitoring device (11) and the measuring instrument (9) by means of a reliable transmission protocol.

In another preferred embodiment, the method for operating a measuring arrangement (100) for measuring a fill level or point level in a bypass (3) of a container (1) with a measuring instrument (9), in particular a fill level or point level measuring instrument, wherein the bypass (3) is connected to the container (1) by means of at least two container connections (5) and has a monitoring device (11) for monitoring a consistency of the container connections (5) that is coupled with the measuring instrument (9), having the following steps:

Performance of a measurement,
Checking of a status of the container connections (5),
Transmission of a measurement result and a status message to a superordinate unit.

In another preferred embodiment, the method as described herein, characterized in that the monitoring device (11) determines a status of the container connections (5) in an event-oriented manner and transmits a status message to the measuring instrument (9).

In another preferred embodiment, the method as described herein, characterized in that the monitoring device (11) cyclically determines a status of the container connections (5) and transmits a status message to the measuring instrument (9).

DETAILED DESCRIPTION OF THE INVENTION

Figure 1:
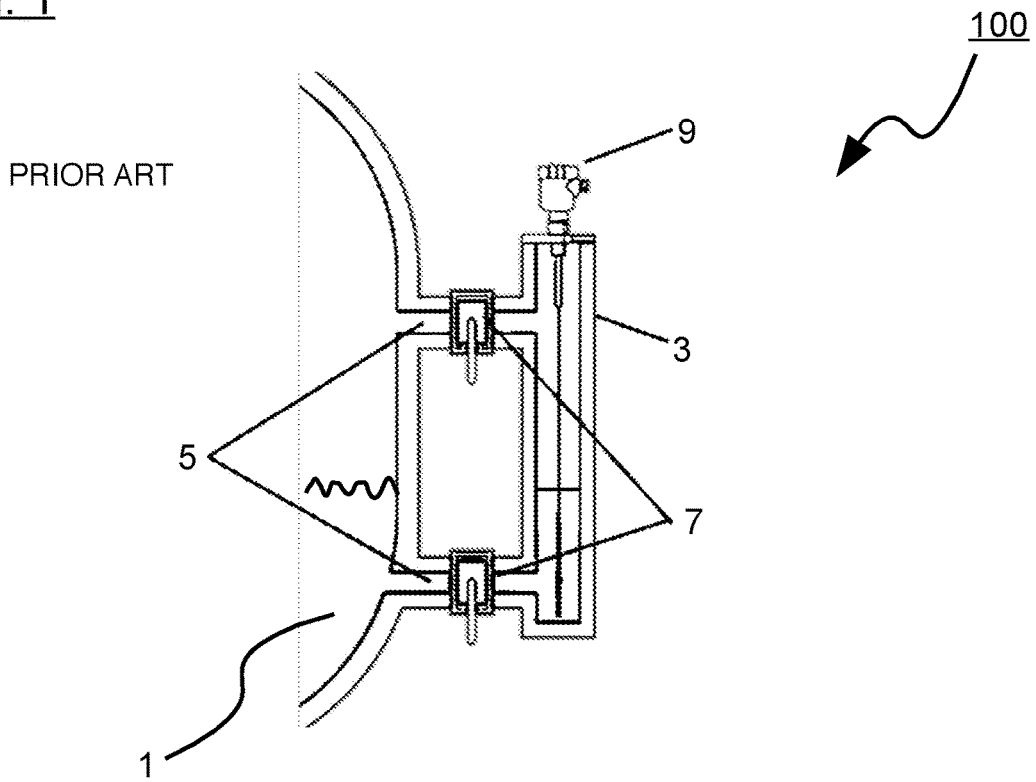
FIG. 1 is a line drawing evidencing a measuring arrangement with a radar fill level measuring instrument arranged in a bypass and according to the prior art (already discussed).

A measuring arrangement according to the invention, in particular a fill level or point level measuring arrangement for measuring a fill level or point level in a bypass of a container with a fill level or point level measuring instrument, wherein the bypass is connected to the container by means of at least two container connections, is characterized by a monitoring device for monitoring a consistency of the container connections that is coupled with the fill level measuring instrument.

Such a monitoring device allows a consistency of the container connection(s) to be monitored and a status of the container connections to a superordinate unit, e.g. a master display, a programmable control unit, or similar to be realized without additional cabling effort between the superordinate unit and the monitoring device. In this way, it can be ensured that the measurement values determined by the fill level or point level measuring instrument also reflect the situation in the container.

The term status should include status messages as well as fault messages, such as the signaling of a maintenance need or an error message.

"Coupled" in the sense of the present application does not mean that a permanent connection between the coupled devices must be present. In addition to a cabled connection, a radio connection is also meant here, in particular an asynchronous radio connection in which a transmission takes place as soon as data is available. In the present case, this means that a changed status of the consistency is transmitted as soon as it is detected. In a preferred embodiment, the monitoring device has one measuring device for each container connection. This means that each container connection can be monitored separately and a status can be determined, for example, for each container connection in the case of a design with two container connections. Such a measuring device can be implemented in a variety of ways, e.g. a rotation angle sensor, a position sensor, or a reed switch for determining a valve position can be used. Alternatively, an ultrasound sensor or a radiometric measuring method can be used to monitor a wall thickness of the container connections for sedimentation.

A particularly simple installation is possible when the measuring devices have a radio module for wireless communication with the measuring instrument. In this way, without additional transmission lines between the measuring devices and the measuring instrument, the status of the container connections can be transmitted. An additional cabling and installation effort is thus minimized. The radio module and a corresponding receiving device can communicate, for example, according to one of the standards Bluetooth, WLAN, LoRa, or Wireless HART. In order to enable an asynchronous radio connection, the receiving device on the measuring instrument should be supplied with electricity and should additionally be equipped with a battery or accumulator, so that a transmission can occur even in a power-free state.

If the measuring devices have an integrated power supply, supply lines for the measuring devices can also be omitted, and the cabling and installation effort can thus be reduced even further.

The smaller the additional cabling and installation effort is, the simpler the installation of monitoring devices with measuring devices can be for all container connections, for example of a bypass system, retrospectively.

A power supply of the measuring devices can occur, for example, in a battery-based manner and/or have an energy harvesting module. Battery-based measuring systems can now have operating times of up to ten years even with radio modules, so that the proposed monitoring arrangement can also be operated largely maintenance-free. An energy harvesting module can further support or completely replace a battery-based operation.

"Energy harvesting" refers to the obtaining of small quantities of electrical energy from the environment by means of energy converters. For example, these can be energy converters for obtaining electrical energy through energy conversion from kinetic, thermal, and electromagnetic energy existing the environment.

When, for example, an isolating valve is arranged between each of the container connections and the bypass and the energy harvesting module is arranged on the valve in such a way that it is possible to generate energy based upon the movement of the valve, then energy can also be generated for the determination and transmission of the status of the container connections, i.e. the status of the valves in the present case, whenever the valve is activated.

For example, the measuring devices can then transmit a valve position of the isolating valve to the measuring instrument. In this way, a valve position of the isolating valves is always known to the measuring instrument, and a corresponding status message can be transmitted along with the measurement values of the measuring instrument to the superordinate unit.

Preferably, communication between the monitoring device and the measuring instrument takes place by means of a reliable transmission protocol.

A "reliable transmission protocol" in the sense of the present application means that it is ensured that the state of the consistency of the container connections determined by the monitoring device or the measuring devices is safely received at the fill level measuring instrument. This can occur, for example, by means of a connection assembly with a handshake procedure and/or a confirmation of receipt and/or of the transmitted state by a so-called acknowledgement.

In this way, it is ensured that the information regarding the status of the container connections is reliably transmitted to the measuring instrument. This ensures that the measurement values determined by the measuring instrument are correctly evaluated by the measuring instrument and the superordinate unit.

A method according to the invention for the operation of a measuring arrangement for measuring a fill level or point level in a bypass of a container with a measuring instrument, in particular a fill level or point level measuring instrument, wherein the bypass is connected to the container by means of at least two container connections and which has a monitoring device for monitoring a consistency of the container connections that is coupled with the fill level measuring instrument, comprises the following steps:

Performance of a measurement,
Checking of a status of the container connections,
Transmission of a measurement result and a status message to a superordinate unit.

First, a measurement, i.e. a fill level or point level measurement, is performed by means of the fill level or point level measuring instrument. In order to verify the validity of the determined measurement results, a status of the container connections is checked. Such an inspection can include both the requirement of a current status in the monitoring device as well as the retrieval of the last determined status from a memory. The second variant is particularly advantageous, because in this way the monitoring device must only transmit a message to the measuring instrument when a status change actually occurs, and thus energy can be saved. This is particularly advantageous in the case of battery operation of the monitoring device and/or the measuring devices.

A transmission of the status only when a status change occurs can also be called "event-oriented." In particular, if an energy harvesting module is used for the energy supply, this is advantageous because, for example, energy for the energy harvesting module can be obtained through the change in the valve position.

In addition or alternatively, the monitoring device can cyclically determine a status of the container connections and transmit a status message to the measuring instrument. In particular, if a status change is not triggered by a movement as in the case of a valve, a cyclical transmission of the status of the container connections can be sensible. However, even in the case of an event-oriented transmission of the status, an additional cyclical transmission can be sensible in order to ensure that the status present in the measuring instrument is also current.

With the present invention, an increased level of security for the user and the monitored process is achieved. The measuring instrument detects independently whether, for example, isolating valves are open or closed or a tube diameter has changed. As a result, human errors in the previously manual process and errors caused by sedimentation in the process are avoided.

A simple retrofitting to existing containers is possible, because no time-consuming and costly conversion of the container or the bypass system is necessary. Further, no time-consuming calibration must be carried out on a superordinate unit, because only the measurement value of the sensor must be input, as is the case with any other measuring point. The plausibility check using the status of the container connections can be carried out completely in the measuring instrument.

All aforementioned embodiments apply equally for bypass systems and for measuring arrangements in which the sensor can be separated from the process by means of a container connection with an isolating device. For example, this can be a measuring arrangement with a radar fill level measuring instrument, in which the radar fill level measuring instrument can be separated from the process area by means of an isolating device, for example an isolating valve, an isolating slider, or a flap.

Detailed Description of the Figures

Figure 2:
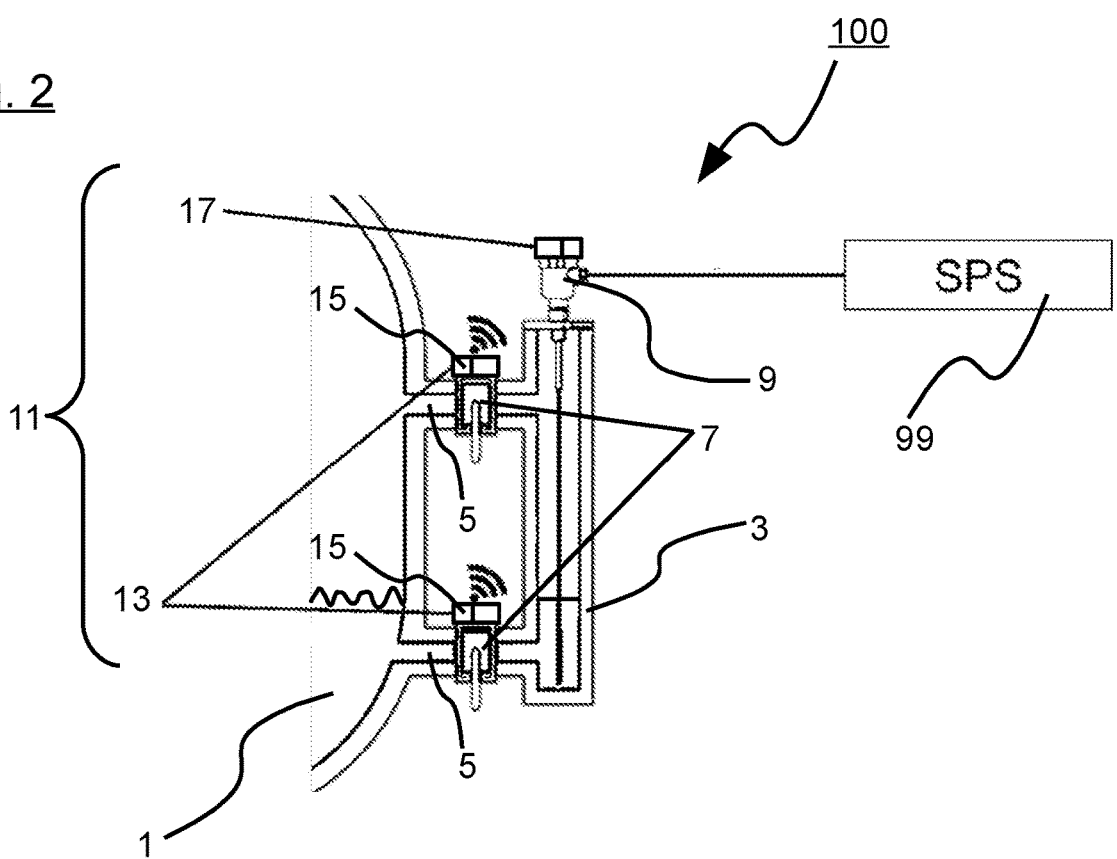
FIG. 2 is a line drawing evidencing a first exemplary embodiment of a measuring arrangement according to the present application with radio transmission.

FIG. 2 shows a first exemplary embodiment of a measuring arrangement 100 according to the present application.

The assembly shown in FIG. 2 comprises a container 1, on which a bypass 3 is mounted by means of container connections 5. A measuring instrument 9 is arranged in the bypass 3, which in the present case is designed as a radar fill level measuring instrument. In the present exemplary embodiment, a continuous measuring of the radar fill level measuring instrument is shown, i.e. a fill level in the bypass is continuously monitored and not only at specified gauge levels. The bypass 3 can be separated from the container 1 by means of two valves 7, which are designed as isolating valves. In this way, as already described above, the performance of work on the bypass 3 is possible without having to completely empty the container 1.

The measuring arrangement 100 shown in FIG. 2 also comprises a monitoring device 11, the two measuring devices 13 which in the present case are arranged on the valves 7, and a receiving device 17, which rests on the measuring instrument 9. In the present exemplary embodiment, the measuring devices 13 have an integrated energy supply 19 as well as a radio module 15 for communication between the measuring device 13 and the receiving device 17 on the measuring instrument 9. Upon activation of the valves 7, this activation is detected by the measuring device 13, and a current valve position is transmitted by means of the radio module 15 to the receiving device 17. If a fill level measurement is carried out by the measuring instrument 9 in the bypass 3, then the determined measurement value is transmitted along with a status of the container connections 5, i.e. in the present case the currently determined valve position, to a superordinate unit 99, which in the present case is designed as a programmable logic controller (PLC). Based on the status of the container connections 5, the validity of the determined state can be verified. If at least one of the valves 7 is closed at the time of the performance of the fill level measurement, then the determined fill level is not valid, because it does not represent the fill level actually present in the container 1.

In the exemplary embodiment shown in FIG. 2, an energy supply of the measuring device 13 occurs, as already described, by means of an integrated energy supply 19. In the present exemplary embodiment, the integrated energy supply 19 is equipped with an energy harvesting module, which obtains sufficient energy for a transmission of the valve position by means of the radio module 15 from a movement of the valve, which occurs for example when opening and closing the valve. In this way, the monitoring device 11 can be completely maintenance-free and can be installed and operated without additional cabling effort for supply or transmission lines.

Figure 3:
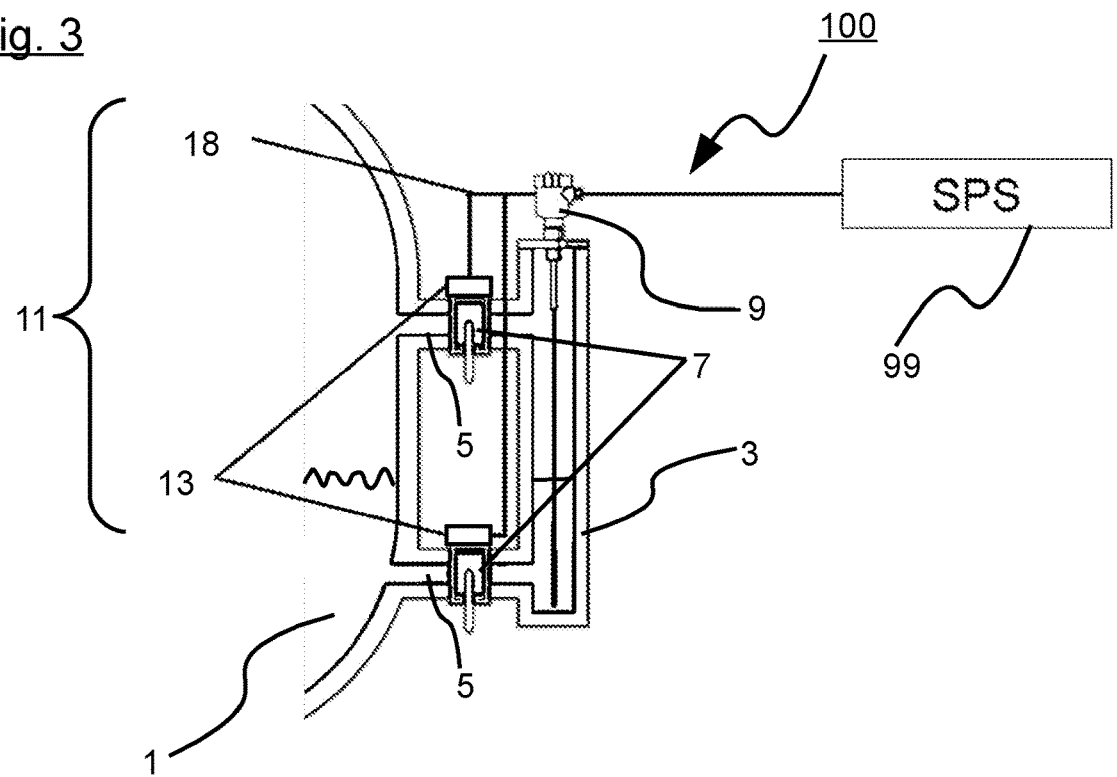
FIG. 3 is a line drawing evidencing a second exemplary embodiment of a measuring arrangement with a cabled transmission.

FIG. 3 shows a second exemplary embodiment of a measuring arrangement 100, which represents a modification of the measuring arrangement 100 shown in FIG. 2. In the exemplary embodiment shown in FIG. 3, the measuring devices 13 that rest on the valves 7 are coupled with the measuring instrument 9 by means of a cabling 18. This embodiment can be an alternative to the exemplary embodiment shown in FIG. 2 in measuring environments in which a radio transmission is not possible, for example due to local conditions.

In the exemplary embodiment shown in FIG. 3, the energy supply of the measuring devices 13 can occur by means of the cabling 18, so that in this case no internal energy supply must be provided.

Figure 4:
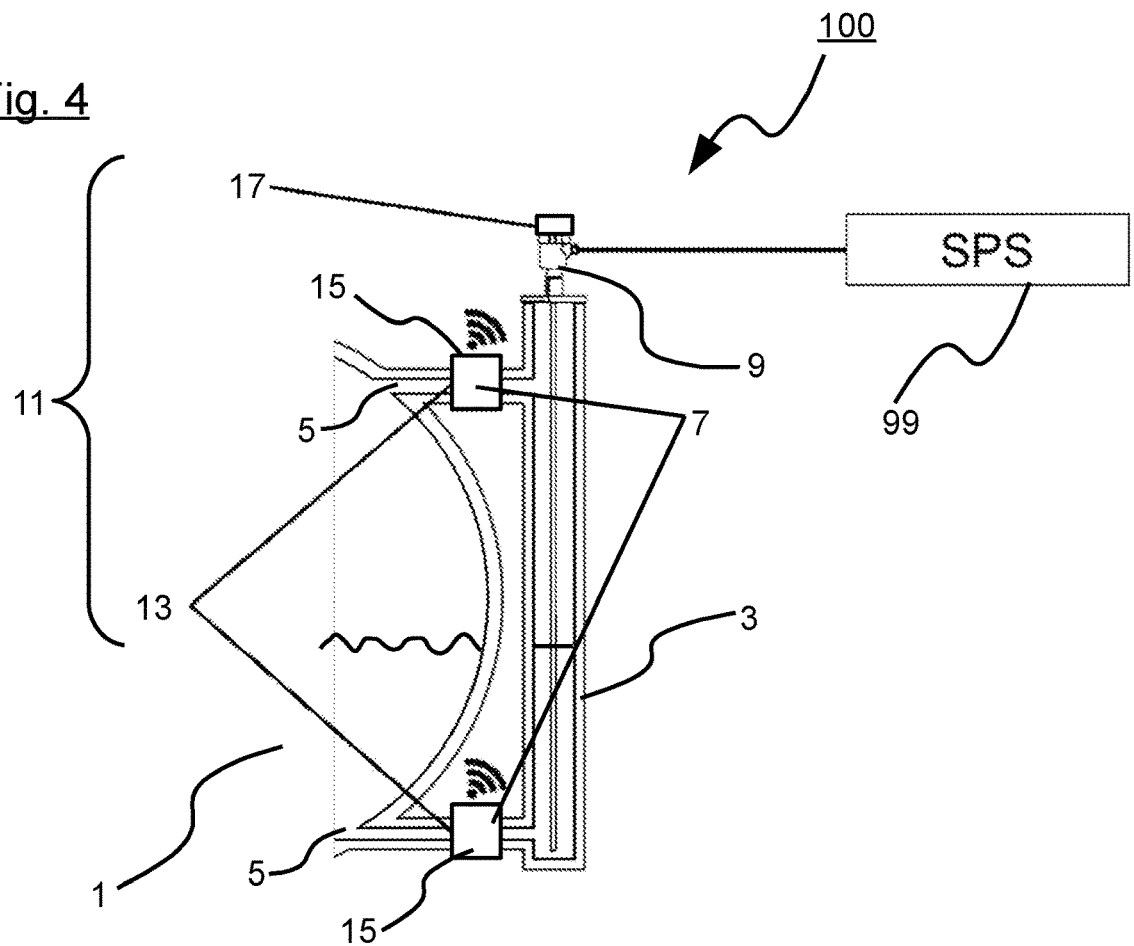
FIG. 4 is a line drawing evidencing a third exemplary embodiment of a measuring arrangement with radio transmission.

FIG. 4 shows a third exemplary embodiment of a measuring arrangement 100 according to the present application.

The arrangement shown in FIG. 4 differs from the exemplary embodiments shown in FIGS. 2 and 3 in that the bypass 3 is permanently connected to the container 1 and cannot be separated from the container 1 by means of valves 7. Even when the arrangement of FIG. 4 has no valves 7 that can close the container connections 5, a monitoring of the container connections 5 is nevertheless sensible, because the container connections 5 can clog, for example due to sedimentation from a medium stored in the container 1 whose fill level is to be measured. If a medium passage is hindered or prevented due to sedimentation in the container connections 5, this can lead to the same problems as in the case of a closed valve. Thus, in the exemplary embodiment shown in FIG. 4, the container connections 5 and the connection lines to the bypass 3 are monitored by a measuring instrument 9, which in the present case measures the wall thickness in the area of the container connections 5. Through such a measuring instrument 9, which is again coupled with the measuring instrument 9 by means of a radio module 15 in the exemplary embodiment shown in FIG. 4, it is effectively possible to monitor a clogging of the container connections 5 and thus to verify the fill levels determined by the measuring instrument 9.

The measuring device 13 shown is supplied with energy by means of an internal energy supply 19, which in the present case is designed as a battery. Through a cyclical operation of the measuring device 13 at specified time intervals, it has only a very low energy consumption, such that a battery lifetime of up to ten years can be achieved for such a measuring device.

Figure 5:
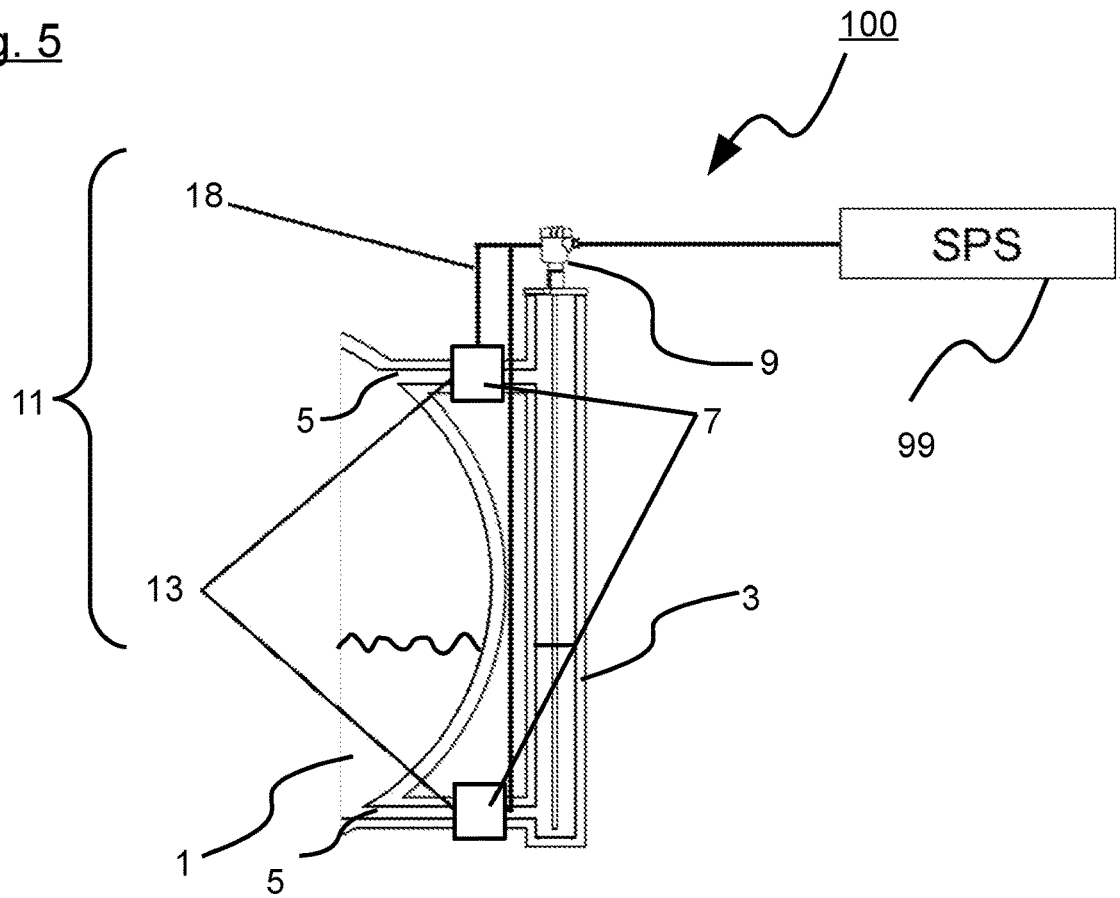
FIG. 5 is a line drawing evidencing a fourth exemplary embodiment of a measuring arrangement with cabled transmission.

FIG. 5 shows the measuring arrangement 100 of FIG. 4 in a cabled design. In this exemplary embodiment, the supply of the measuring devices 13 with energy occurs by means of the measuring instrument 9 and the cabling 18.

Figure 6:
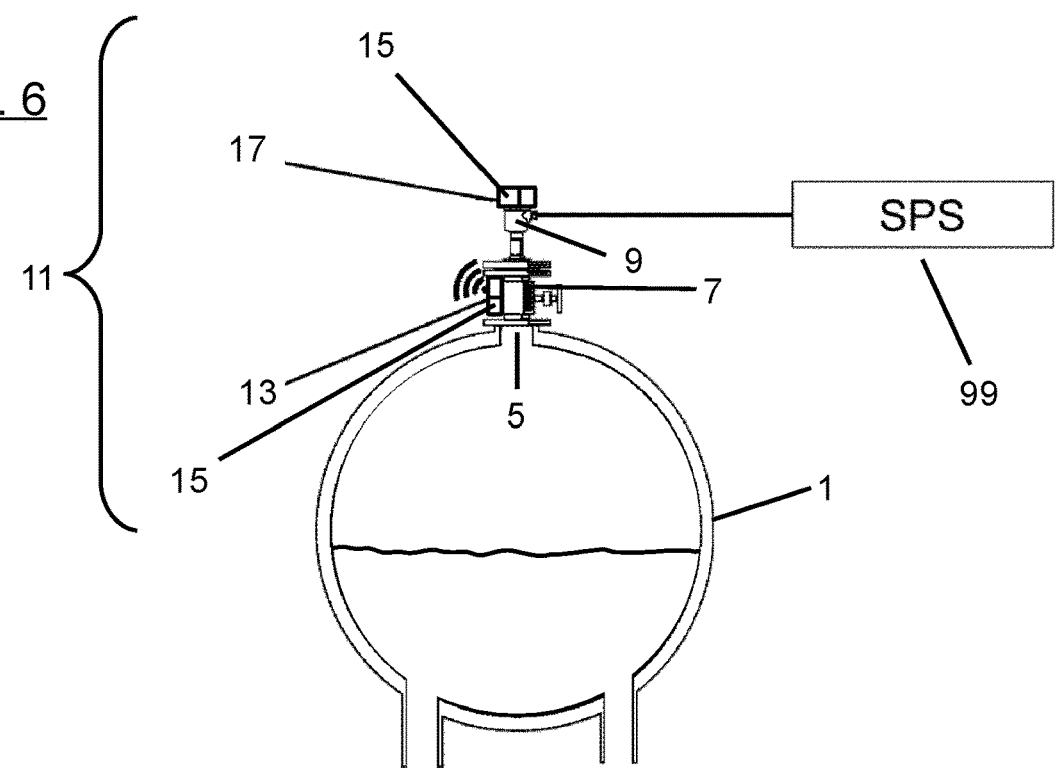
FIG. 6 is a line drawing evidencing a fifth exemplary embodiment of a measuring arrangement with radio transmission.

FIG. 6 shows a fifth exemplary embodiment of a measuring arrangement with radio transmission.

On the container 1 shown in FIG. 6, by means of a container connection 5, embodied as a fluid-filled channel, a measuring instrument 9 is arranged which in the present case is designed as a radar fill level measuring instrument and can be separated from the container 1 by means of a slider 7. By means of the slider 7, the measuring instrument can be separated from an interior of the container 1 in a pressure-tight and fluid-tight manner and, for example in the case of pressurized containers, serviced or exchanged even if the container is full. If the slider 7 is not or only partially open, then the measuring instrument 9 cannot detect measurement values or can only detect false measurement values that do not reflect the situation in the container 1.

The slider 7 is equipped with a measuring device 13 with a radio module 15, so that a position of the slider 7 on the measuring instrument 9, which is similarly equipped with a radio module, can be further reported. From the measuring instrument 9, the determined measurement values and the status of the slider 7 are forwarded to the PLC used as the superordinate unit 99.

Figure 7:
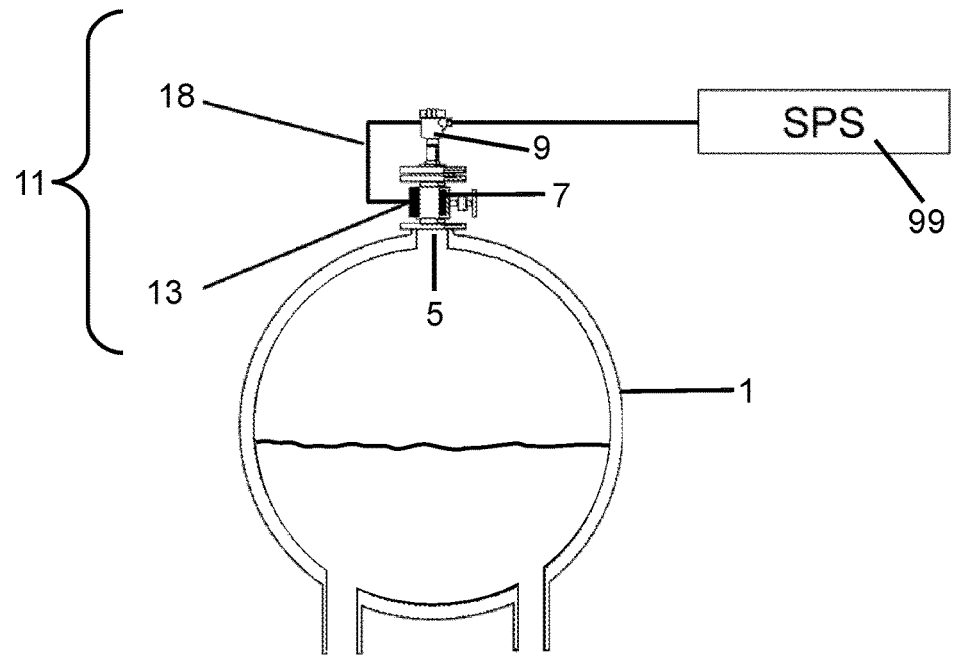
FIG. 7 is a line drawing evidencing a sixth exemplary embodiment of a measuring arrangement with cabled transmission.

FIG. 7 shows a sixth exemplary embodiment of a measuring arrangement with cabled transmission. The embodiment according to FIG. 7 differs from the assembly according to FIG. 6 only in that the transmission between the measuring device 12 [sic: 13] and the measuring instrument 9 takes place by means of a cabling 18.

Figure 8:
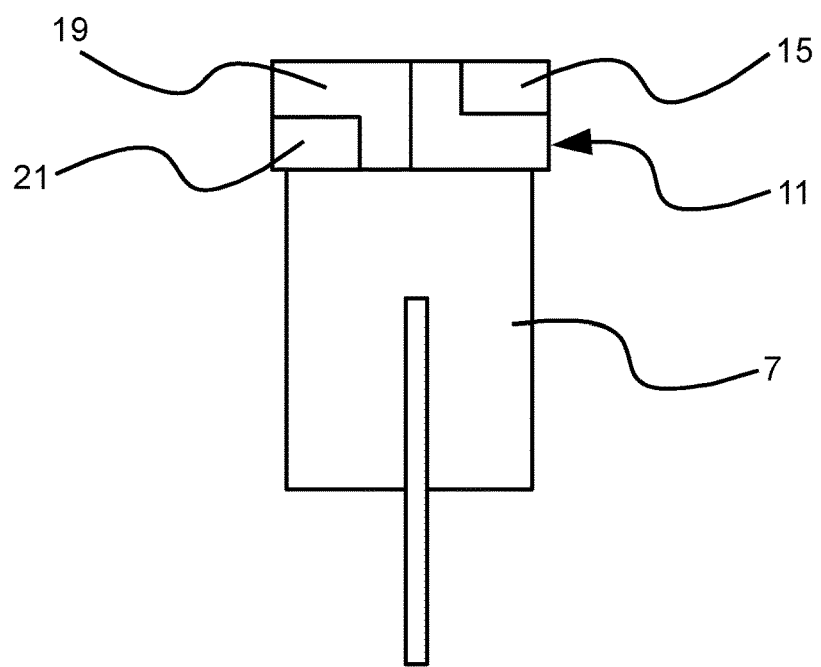
FIG. 8 is a line drawing evidencing an enlarged view of a valve with a monitoring device arranged on it.

FIG. 8 shows an enlarged view of a valve 7 with a monitoring device 11 arranged on it. In the present exemplary embodiment, the monitoring device 11 has a radio module 15 with which it communicates with the receiving device 17 of the measuring instrument 9. Further, the monitoring device 11 has an internal energy supply 19, which in the exemplary embodiment shown is equipped with an energy harvesting module 21. The energy harvesting module 21 obtains sufficient energy from a positional movement of the valve 7 in order to determine a current valve position and transmit it by means of the radio module 15 to the measuring instrument 9. Not shown in FIG. 6 is an additional buffer battery of the internal energy supply 19, which holds sufficient energy for the event that the energy harvesting module 21 has not generated enough energy for the status transmission.

LIST OF REFERENCE NUMBERS

1 Container
3 Bypass
5 Container connection
7 Valve/slider
9 Measuring instrument
11 Monitoring device
13 Measuring device
15 Radio module
17 Receiving device
18 Cabling
19 Energy supply
21 Energy harvesting module
99 Superordinate unit
100 Measuring arrangement Unless indicated otherwise, identical reference numbers in the figures identify identical components with the same function. The terms drive unit and drive are used interchangeably herein.

The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

We claim:

1. A measuring arrangement for measuring a fill level in a container with a measuring instrument comprising a fill level or point level measuring instrument, wherein the measuring instrument is connected to the container by means of at least one container connection embodied as a fluid-filled channel, further comprising a monitoring device for monitoring a consistency of the at least one container connection that is coupled with the measuring instrument, such that each of the monitoring device and measuring instrument is monitoring independently, wherein an isolating device is arranged in the container connection and the measuring instrument can be disconnected from the process via the container connection with the isolating device.

2. The measuring arrangement of claim 1, wherein the monitoring device comprises one measuring device for each container connection.

3. The measuring arrangement of claim 1, wherein the measuring devices comprise a radio module for wireless communication with the measuring instrument.

4. The measuring arrangement of claim 1, wherein the measuring devices comprise an integrated energy supply.

5. The measuring arrangement of claim 4, wherein the energy supply comprises an energy harvesting module.

6. The measuring arrangement of claim 5, further comprising wherein the isolating device is arranged between the container connections and the bypass and the energy harvesting module is coupled with the isolating device in such a way that it generates energy due to a movement of the isolating device.

7. The measuring arrangement of claim 6, wherein the measuring devices transmit a valve position of the valve to the measuring instrument.

8. The measuring arrangement of claim 1, wherein there is a communication between the monitoring device and the measuring instrument by means of a reliable transmission protocol.

9. A method for operating a measuring arrangement for measuring a fill level or point level in a bypass of a container with a measuring instrument, in particular a fill level or point level measuring instrument, wherein the bypass is connected to the container by means of at least two container connections embodied as fluid-filled channels and comprises a monitoring device for monitoring a consistency of the container connections that is coupled with the measuring instrument, such that each of the monitoring device and measuring instrument is monitoring independently, wherein an isolating device is arranged in the container connection and the measuring instrument can be disconnected from the process via the container connection with the isolating device, such method having the following the steps:
    Performance of a measurement,
    Checking of a status of the container connections, and
    Transmission of a measurement result and a status message to a superordinate unit.

10. The method of claim 9, wherein the monitoring device determines a status of the container connections in an event-oriented manner and transmits a status message to the measuring instrument.

11. The method of claim 9, wherein the monitoring device cyclically determines a status of the container connections and transmits a status message to the measuring instrument.

* * * * *